United States Patent

Nishino et al.

[11] Patent Number: 5,837,213
[45] Date of Patent: Nov. 17, 1998

[54] PROCESS FOR THE DESULFURIZATION OF SULFUROUS ACID GAS-CONTAINING WASTE GAS

[75] Inventors: Haruo Nishino, Kawasaki; Yoshio Ogawa, Tokyo; Kazushige Kawamura, Yokohama, all of Japan

[73] Assignee: Chiyoda Corporation, Yokohama, Japan

[21] Appl. No.: 653,723

[22] Filed: May 23, 1996

[30] Foreign Application Priority Data

May 30, 1995 [JP] Japan ..................................... 7-155119

[51] Int. Cl.⁶ .................................................. B01D 53/50
[52] U.S. Cl. .............................. 423/243.01; 423/243.08; 422/168
[58] Field of Search ........................... 423/242.1, 243.01, 423/243.08; 422/168

[56] References Cited

U.S. PATENT DOCUMENTS

| 4,156,712 | 5/1979 | Kanai et al. ............................ 423/242 |
| 4,368,060 | 1/1983 | Yanagiako et al. .......................... 55/73 |
| 4,911,901 | 3/1990 | Ogawa et al. ........................... 423/242 |
| 4,931,263 | 6/1990 | Wakui et al. ......................... 423/215.5 |
| 5,106,603 | 4/1992 | McCord et al. ......................... 423/242 |
| 5,120,518 | 6/1992 | Yanagioka et al. ...................... 423/242 |
| 5,660,616 | 8/1997 | Choi et al. ................................. 95/213 |

FOREIGN PATENT DOCUMENTS

| 0 308 217 A2 | 3/1989 | European Pat. Off. . |
| 0 396 375 A2 | 11/1990 | European Pat. Off. . |
| 3-72913 | 3/1991 | Japan . |
| 3-70532 | 11/1991 | Japan . |
| 6-86910 | 3/1994 | Japan ................. 423/243.01 |
| 6134251 | 5/1994 | Japan ................. 423/243.01 |

*Primary Examiner*—Gary P. Straub
*Assistant Examiner*—Timothy C Vanoy
*Attorney, Agent, or Firm*—Armstrong, Westerman, Hattori, McLeland & Naughton

[57] ABSTRACT

A process for the desulfurization of a sulfurous acid gas-containing waste gas by blowing the waste contact into an absorbing liquid through a plurality of sparger pipes is disclosed, wherein various operation conditions are specifically correlatively controlled to carry out the desulfurization in a stable manner at minimum costs.

10 Claims, 5 Drawing Sheets

PROCESS FOR THE DESULFURIZATION OF SULFUROUS ACID GAS-CONTAINING WASTE GAS

BACKGROUND OF THE INVENTION

This invention relates to a process for the desulfurization of a sulfurous acid gas-containing waste gas by contact with an absorbing liquid.

A desulfurization process is known wherein a waste gas containing sulfurous acid gas (sulfur dioxide) is blown into a pool of an absorbing liquid contained in a reaction vessel through a plurality of gas dispersing pipes (sparger pipes) each of which vertically extends downward from a partition plate into the absorbing liquid and has a side peripheral wall provided with a multiplicity of gas injection holes at a lower portion thereof, so that the waste gas is desulfurized by contact with the absorbing liquid and wherein the resulting desulfurized gas is passed to an upper space defined between the partition plate and the liquid level of the absorbing liquid and is discharged from the reaction vessel (JP-B-3-70532 and JP-A-3-72913).

The known process, however, has problems that a relatively high costs are required for operating the process and for constructing the apparatus therefor and that the process is not able to be performed in a stable manner for a long period of time.

SUMMARY OF THE INVENTION

It is, therefore, the prime object of the present invention to provide a process which can desulfurize a sulfurous acid gas-containing waste gas at a low operation cost in a stable manner.

In accomplishing the foregoing object, there is provided in accordance with the present invention a process for the desulfurization of a sulfurous acid gas-containing waste gas, wherein said waste gas is blown into a pool of a stirred absorbing liquid, contained in a reaction vessel and having a liquid level, through a plurality of gas dispersing pipes each vertically extending downward from a partition plate into said absorbing liquid and each having a side peripheral wall provided with a multiplicity of gas injection holes at a lower portion thereof, so that said waste gas is desulfurized by contact with said absorbing liquid and the resulting desulfurized gas is passed to an upper space defined between said partition plate and said liquid level of said absorbing liquid, characterized in that said gas injection holes of each of said gas dispersing pipes are substantially horizontally aligned;

in that each adjacent two gas injection holes of each of said gas dispersing pipes are spaced apart from each other such that, when each of said two gas injection holes is regarded as a circle having the same area as the area thereof, the distance P between the centroids of said adjacent two gas injection holes satisfies the following condition:

$$1.15 \leq P/D \leq 6$$

wherein D is a diameter of one of said two circles which is smaller than the other;

in that the maximum velocity $V_{max}$ of said waste gas passing through each of said gas injection holes is controlled so that the following conditions are satisfied:

$$Y \geq 4.5S$$

$$Y \leq 24S$$

$$0.05 \leq Y \leq 1.0$$

$$0.005 \leq S \leq 0.06$$

wherein Y represents a pressure of said waste gas required for carrying out the desulfurization and S represents a value obtained by dividing the dynamic pressure of said waste gas injected through said gas injection hole at said maximum velocity $V_{max}$ by the density of said absorbing liquid;

in that said gas dispersing pipes are arranged such that the minimum distance $L_I$ between two adjacent dispersing pipes satisfies the following condition:

$$1.5 \leq L_I/S \leq 10.0$$

wherein S is as defined above; and in that said gas injection holes of each of said gas dispersing pipes are located so that the average distance $L_{II}$ between the liquid level of said absorbing liquid in the state where no gases are injected thereinto and the center of each of said gas injection holes satisfies the following condition:

$$2 \leq L_{II}/S \leq 20$$

wherein S is as defined above.

BRIEF DESCRIPTION OF THE DRAWINGS

Other objects, features and advantages of the present invention will become apparent from the detailed description of the preferred embodiments of the invention which follows, when considered in light of the accompanying drawings in which.

DETAILED DESCRIPTION OF THE PREFERRED EMBODIMENTS OF THE INVENTION

Figure 1:
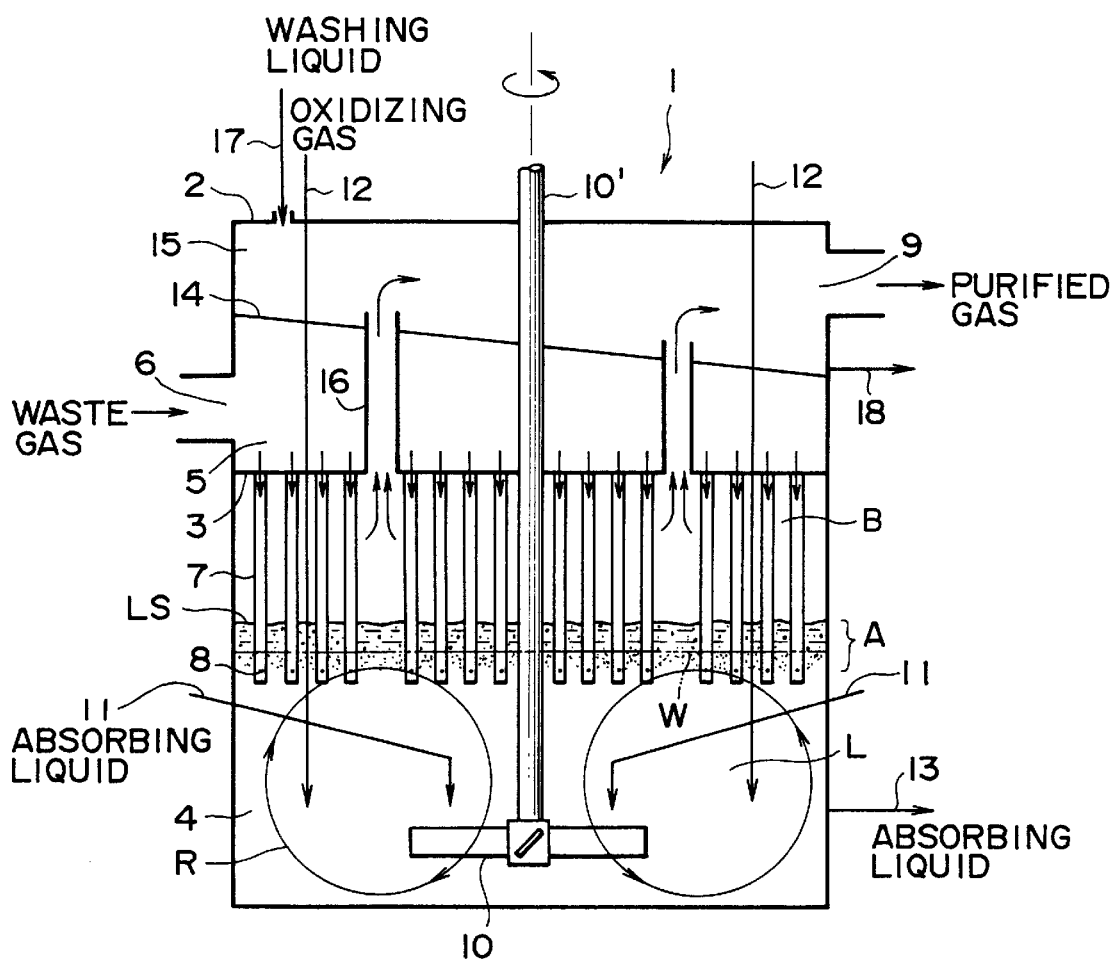
FIG. 1 is an elevational, cross-sectional view diagrammatically showing one embodiment of a desulfurization apparatus suitable for carrying out the process of the present invention.

Referring first to FIG. 1, designated generally as 1 is a desulfurization apparatus suitable for carrying out the process of the present invention. The apparatus 1 has a housing member 2 within which first and second partition plate members 3 and 14 are disposed for dividing the inside space thereof into a first, lowermost chamber 4, a second, intermediate chamber 5 and a third, uppermost chamber 15. Each of the partition plate members 3 and 14 may be a horizontal plate or a plate inclined gradually or stepwise. An inclined plate is generally used as the partition plate member 14.

The first chamber 4 contains a pool of an absorbing liquid L such that an upper space B is defined above the liquid level LS of the absorbing liquid L.

A gas inlet port 6 is provided in the second chamber 5 for introducing the waste gas to be treated into the second chamber 5. A plurality of gas dispersing pipes (sparger pipes) 7 are secured to the partition plate 3 and vertically extending downward into the first chamber 4 such that the waste gas introduced into the second chamber 5 is blown into the absorbing liquid L through the sparger pipes 7. Each of the sparger pipes 7 has a side peripheral wall provided with a multiplicity of horizontally aligned gas injection holes 8 at a lower portion thereof.

Designated as W is a liquid level of the absorbing liquid L in the state where no gas is fed to the sparger pipes 7. The gas injection holes 8 are located below the liquid level W. Thus, the waste gas fed to the sparger pipes 7 is injected into the absorbing liquid L through the gas injection holes 8 so that a mixed gas-liquid phase layer A is formed on the surface of the absorbing liquid. The sulfurous acid gas contained in the waste gas is absorbed in the absorbing liquid L in this gas-liquid phase layer A. The waste gas desulfurized by contact with the absorbing liquid L then flows into the upper space B above the liquid level LS. The absorbing liquid L may be an aqueous gypsum slurry containing an absorbent such as a calcium compound, e.g. lime stone or slaked lime.

One or more riser pipes 16 are provided for connecting the first and third chambers 4 and 15. The third chamber 15 has a gas discharge port 9 at an upper portion thereof. Thus, the desulfurized gas in the upper space B flows upward as well as in the horizontal direction. During the flow of the desulfurized gas in the upper space B, a greater part of the mist and solid particles contained therein are separated therefrom by gravity and by collision with the sparger pipes 7. The desulfurized gas from which such liquid and solid particles have been separated is passed through the riser pipes 16 to the third chamber 15. The upward gas flow is thus converted into a horizontal gas flow and is discharged from the third chamber 15 through the outlet port 9.

During the passage of the desulfurized gas through the third chamber 15, the entraining liquid and solid particles are separated and collected on the partition plate 14. A washing liquid, such as a gypsum-containing aqueous slurry, the absorbing liquid from which gypsum is separated, water or sea water, is supplied from a conduit 17 to the third chamber 15 to remove the deposits on the partition plate 14 and is discharged through a discharge conduit 18.

Preferably, the average ascending velocity of the desulfurized gas in the upper space B is 0.5–5 m/s, more preferably 0.7–4 m/s, from the standpoint of economy and efficiency of the separation of mist and solid particles. The average ascending velocity herein is based on the horizontal sectional area of the upper space B excluding the sectional areas of the sparger pipes 7 and the like structures which do not provide passages for the desulfurized gas. The average horizontal velocity of the desulfurized gas in the upper space B is preferably 8 m/s or less, more preferably 6 m/s or less for reasons of the formation of stable mixed gas-liquid phase layer A. The average horizontal velocity is based on the vertical sectional area of the upper space B at a position adjacent to the riser pipe 16.

The velocity of the desulfurized gas flowing upward through the riser pipes 16 is preferably 6–20 m/s, more preferably 8–15 m/s for reasons of effective separation of the mist and solid particles and economy.

The desulfurized gas introduced into the third chamber 15 impinges against the top wall of thereof and is directed horizontally. Thus, the entraining liquid and solid particles are separated in the third chamber 15 by the impingement and by gravity. The average horizontal velocity of the desulfurized gas in the third chamber is preferably 10 m/s or less, more preferably 8 m/s or less for reasons of effective separation of these particles. The average horizontal velocity is based on the vertical sectional area of the third chamber at a location horizontally spaced apart a distance of 2 m from the outlet port 9.

Figure 3:
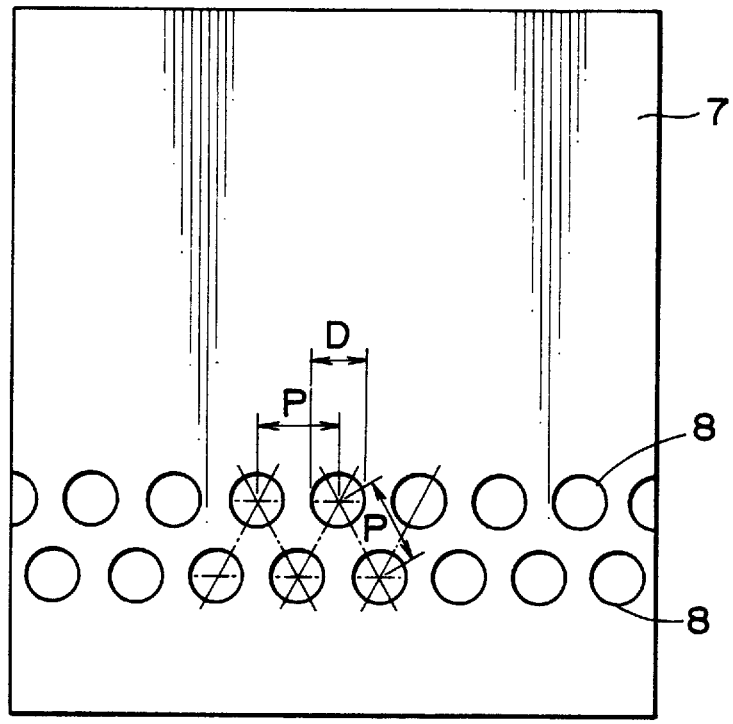
FIG. 3 is a view similar to FIG. 2 showing another embodiment of the gas injection hole arrangement of a sparger pipe.

Each of the sparger pipes 7 may have any desired sectional shape such as a circular shape, a polygonal (triangle, square or hexagonal) shape or a rectangular (trough) shape. The gas injection holes 8 formed on the side peripheral wall of each sparger pipe 7 may have any desired shape such as a circle, triangle, rectangular, hexagonal, slit or star-like shape. If desired, the injection holes 8 may be arranged into two or more arrays, as shown in FIG. 3. It is preferred that the equivalent inside diameter $D_p$ of the sparger pipes 7 satisfy the following condition:

$$2D_H \leq D_p \leq 12D_H, \text{ more preferably } 3D_H \leq D_p \leq 10D_H,$$

where $D_H$ represents the equivalent diameter of the gas injection hole 8.

Generally, the equivalent inside diameter $D_p$ is 25–300 mm, preferably 50–300 mm. The equivalent diameter $D_H$ of the injection hole 8 is generally 3–100 mm, preferably 5–50 mm.

The equivalent diameters $D_p$ and $D_H$ are as defined below:

$$D_p = 4S_p/L_p$$

wherein $S_p$ represents the horizontal sectional area of the inside of the sparger pipe 7 at a location at which the gas injection holes 8 are provided and $L_p$ represents the inside peripheral length of the gas sparger pipe 7 at the same location as above, and $$D_H = 4S_H/L_H$$

wherein $S_H$ represents the area of the gas injection hole 8 and $L_H$ represents the inside peripheral length of the gas injection hole 8.

The lower open end of each of the sparger pipes 7 may be in any desired shape and may be, for example, horizontal, slanted, notched or waved.

The average axial distance $L_{ax}$ between the center (centroid of geometry) of the gas injection hole and the lower end of the sparger pipe 7 is preferably so adjusted that almost no waste gas is passed through the lower open end of the sparger pipe or, in other words, that the liquid level of the absorbing liquid L always exists in the sparger pipe 7. This can be achieved by adjusting the distance $L_{ax}$ to 3 S to 8 S, more preferably 4 S to 7 S, wherein S represents a value obtained by dividing the dynamic pressure of the waste gas injected through the gas injection hole at the maximum velocity $V_{max}$ by the density of the absorbing liquid L.

One preferred sparger pipe 7 is a plastic cylinder having an inside diameter of 25–300 mm and provided with a plurality of equally spaced apart round holes having a diameter of 5–100 mm.

The riser pipe 16 may have any desired sectional shape such as a circular, square or rectangular shape.

Figure 2:
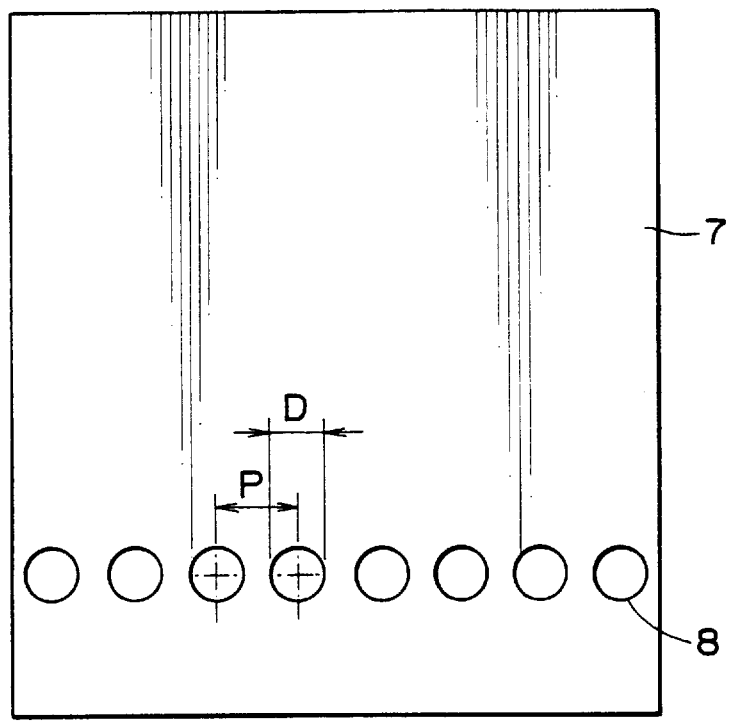
FIG. 2 is a developed, elevational view schematically showing one embodiment of the gas injection hole arrangement of a sparger pipe.

It is important that each adjacent two gas injection holes 8 of each of the gas dispersing pipes 7 should be spaced apart from each other such a distance that, when each of the two gas injection holes 8 is regarded as a circle having the same area as the area of the hole 8, the distance P between the centroids (center of gravity of the geometry) of the adjacent two gas injection holes satisfies the following condition:

$$1.15 \leq P/D \leq 6, \text{ preferably } 1.2 \leq P/D \leq 5,$$

wherein D is a diameter of one of the two circles which is smaller than the other. FIGS. 2 and 3 depict examples of the gas injection hole arrangement.

When the P/D ratio is smaller than 1.15, the desulfurization rate is considerably lowered since the waste gas flows injected through separate injection holes are apt to be combined. Namely, the jet flows from adjacent injection holes interfere with each other so that the mixed gas-liquid phase layer A (froth phase layer) becomes unstable A P/D ratio of below 1.15 is also disadvantageous in fabrication and maintenance of the sparger pipe 7. On the other hand, too large a P/D ratio in excess of 6 causes lowering of the volume efficiency so that it is disadvantageously necessary to use a large-sized apparatus.

It is also important that the maximum velocity $V_{max}$ of the waste gas passing through each of the gas injection holes 8 is controlled so that the following conditions (1)–(4) are satisfied:

$$Y \geq 4.5S, \text{ preferably } Y > 6.5S \quad (1)$$

$$Y \leq 24S, \text{ preferably } Y \leq 22S \quad (2)$$

$$0.05 \leq Y \leq 1.0 \quad (3)$$

$$0.005 \leq S \leq 0.06 \quad (4)$$

wherein Y represents a pressure of the waste gas required for carrying out the desulfurization and S represents a value obtained by dividing the dynamic pressure of the waste gas injected through the gas injection hole at the maximum velocity $V_{max}$ by the density of the absorbing liquid.

The pressure of the waste gas required for the desulfurization (pressure in terms of absorbing liquid column; unit: m) is defined by:

$$Y = T + L_{II}$$

wherein T represents a value obtained by dividing the pressure loss (unit: kg/m$^2$) of the waste gas passing through the gas injection hole 8 by the density $\rho_{II}$ (unit: kg/m$^3$) of the absorbing liquid L and $L_{II}$ represents an average distance between the centroid of the gas injection hole 8 and the liquid level W of the absorbing liquid in the state where no gas is injected into the sparger pipe 7. In other words, the pressure Y is a value obtained by dividing the pressure (unit: kg/m$^2$) required for the waste gas fed to the sparger pipe 7 to pass through the gas injection hole 8 to the upper space B by the density $\rho_{II}$ (unit: kg/m$^3$) of the absorbing liquid L.

Practically, the value T is in the range of between 2.5 S and 4 S (where S is as defined above) and depends upon the shape of the gas injection hole 8 and flow rate of the waste gas. Since, in the present invention, $L_{II}/S$ is between 2 and 20, preferably between 4–18, as described hereinafter, the pressure Y is expressed as follows:

$$\begin{aligned} Y &= T + L_{II} \\ &= (2.5 \text{ to } 4)S + (2 \text{ to } 20)S \\ &= (4.5 \text{ to } 24)S \end{aligned}$$

The maximum velocity $V_{max}$ and the S value have the following relationship:

$$\begin{aligned} S &= \text{(dynamic pressure at the maximum velocity } V_{max})/ \\ &\quad \text{(density } \rho_{II} \text{ of the absorbing liquid)} \\ &= (\rho_I \times V_{max} \times V_{max}/2G)/\rho_{II} \\ &= V_{max}^2 \times \rho_I/2G\rho_{II} \end{aligned}$$

wherein $\rho_I$ represents the density (kg/m$^3$) of the waste gas, $\rho_{II}$ represents the density (kg/m$^3$) of the absorbing liquid and G represents the gravitational acceleration (9.8 m/s$^2$).

Figure 5:
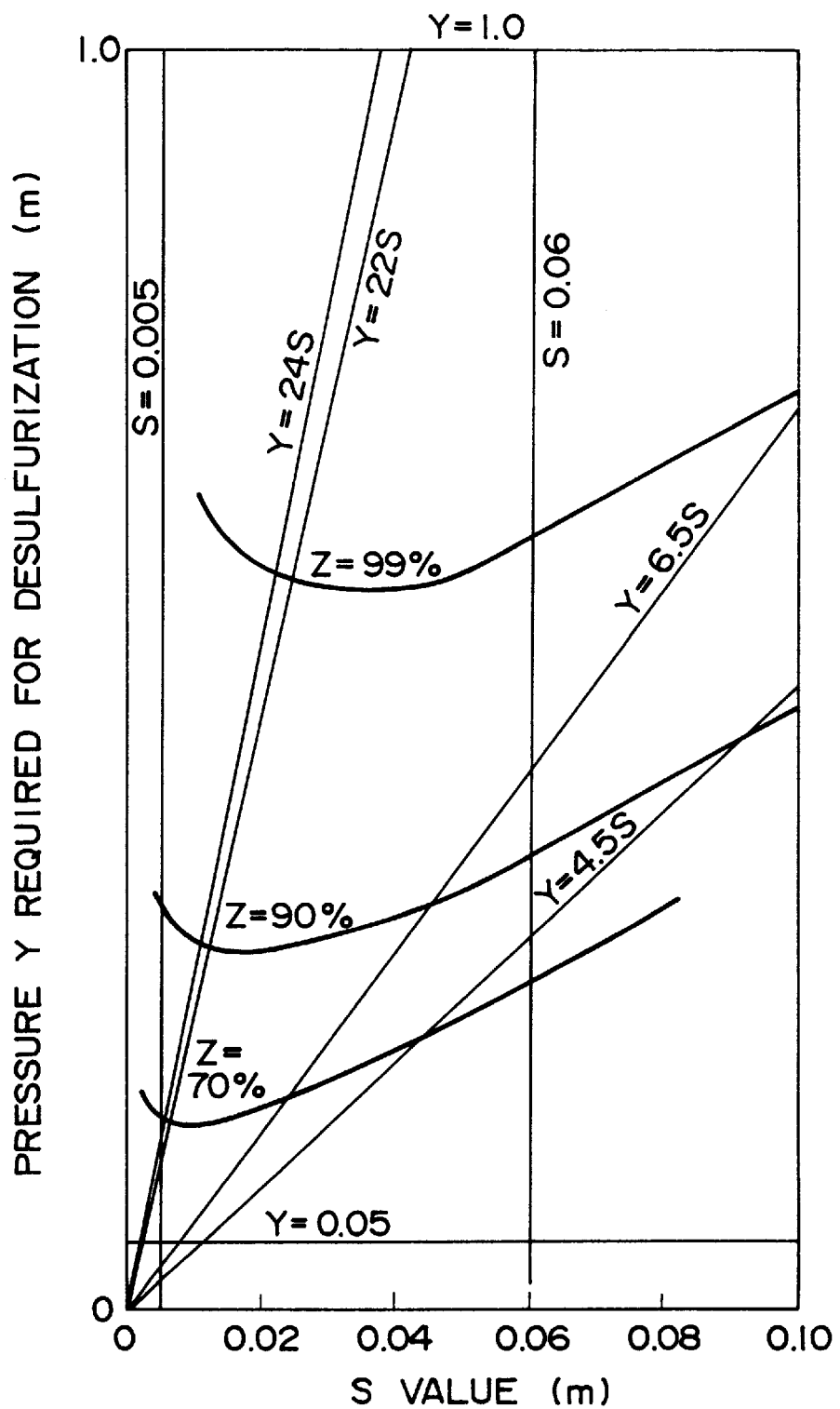
FIG. 5 is a graph showing a relationship between the pressure of the waste gas required for desulfurization and the S value.

FIG. 5 shows a relationship between the S-value and the pressure Y at various desulfurization rates Z. The term "desulfurization rate Z" used herein is defined as follows:

$$Z = (1 - Q_{out}/Q_{in}) \times 100 \, (\%)$$

wherein $Q_{out}$ represents the flow rate of sulfurous acid gas contained in the purified gas discharged through the outlet port 9 and $Q_{in}$ represents the flow rate of sulfurous acid gas contained in the waste gas introduced through the inlet port 6. As seen in FIG. 5, there exists a minimum value in the pressure Y in a given desulfurization rate Z. It is preferred that the S value be selected so that Y is minimum at the intended desulfurization rate. For example, when a desulfurization rate Z of 90% is intended, the S value of about 0.017 m is preferably used. When a desulfurization rate Z of 70% is intended, the S value is preferably about 0.009 m. When the desulfurization is carried out while alternately shifting the intended desulfurization rate between 99% and 70%, the S value is preferably set at 0.035 m which provides the minimum pressure Y at the 99% desulfurization rate and which satisfies the above conditions (1)–(4) at the 70% desulfurization rate. Once the S value is determined, the maximum velocity $V_{max}$ is determined according to the above-described formula:

$$S = V_{max}^2 \times \rho_I/2G\rho_{II}.$$

The number of the sparger pipes 7 and the total area of the openings of the gas injection holes 8 in each of the sparger pipes 7 are then determined on the basis of the maximum velocity $V_{max}$.

The arrangement of the sparger pipes 7 connected to the partition plate 3 is not specifically limited as long as the distance $L_I$ between two adjacent sparger pipes 7 satisfies the following condition:

$$1.5 \leq L_I/S \leq 10.0, \text{ preferably } 2 \leq L_I/S \leq 8,$$

wherein S is as defined above. The distance $L_I$ is the minimum distance from the outer periphery of one sparger pipe 7 to the outer periphery of that sparger pipe 7 which is located nearest of all. When the $L_I/S$ ratio is smaller than 1.5, the desulfurization rate is considerably lowered since the jet flows from the two sparger pipes 7 interfere with each other so that the mixed gas-liquid phase layer A becomes unstable. On the other hand, too large a $L_I/S$ ratio in excess of 10 causes lowering of the volume efficiency so that it is necessary to use a large-sized apparatus.

The distance $L_I$ is generally 0.05–0.6 m, preferably 0.075–0.45 m, and is so selected as to meet with the requirement for the above $L_I/S$ ratio. For reasons of an increased amount of the waste gas treated per unit area of the partition plate 3, it is preferred that the distance $L_I$ be as small as possible. The S value is determined according to the equation described above. In this connection, the maximum velocity $V_{max}$ is in the range of 8–35 m/s, the density $\rho_I$ of the waste gas if 0.91–1.2 kg/m$^3$, and the density $\rho_{II}$ of the absorbing liquid is 1,000–1,300 kg/m³. For reasons of the reduction of operation costs (desulfurization costs) of the desulfurization apparatus, the S value is desired to be as small as possible, although, from the standpoint of construction costs, too small an S value is undesirable. By reducing the velocity of the waste gas passing through the gas injection holes, namely by increasing the equivalent diameter $D_H$ of the gas injection holes or by increasing the number of the gas injection holes, the S value can be made small. As described previously, the equivalent diameter $D_H$ of the injection hole 8 is generally 3–100 mm.

It is also important that the gas injection holes 8 of each of the sparger pipes 7 are located so that the average distance $L_{II}$ between the liquid level W of the absorbing liquid L in the state where no gases are injected into the sparger pipe 7 and the center of each of the gas injection holes 8 satisfies the following condition:

$$2 \leq L_{II}/S \leq 20,$$

preferably $4 \leq L_{II}/S \leq 18$, more preferably $6 \leq L_{II}/S \leq 16$, wherein S is as defined above.

When the $L_{II}/S$ ratio is less than 2, the waste gas fails to be sufficiently contacted with the absorbing liquid L so that the desulfurization efficiency is lowered. When the $L_{II}/S$ ratio exceeds 20, the bubbles of the waste gas are combined and grow in size during the passage through the absorbing liquid L so that the efficiency in the liquid-gas contact is lowered. The depth $L_{II}$ is generally 0.05–0.9 m, preferably 0.075–0.75 m.

When the S value is large or when the depth $L_{II}$ is large, the pressure Y of the waste gas is high and the desulfurization rate increases. However, the operation costs which depend upon the pressure Y increase as the pressure Y increases. When the $L_{II}/S$ ratio is maintained in the above-described range, it is possible to maintain the pressure Y of the waste gas supplied to the sparger pipes in a low level. Thus, it is possible to save the energy required for the desulfurization and to reduce the desulfurization costs.

By adjusting the depth $L_{II}$ so as to meet with the above-described conditions $4.5 \, S \leq Y \leq 24 \, S$ (FIG. 5) and $2 \leq L_{II}/S \leq 20$, the pressure Y required for the desulfurization can be made small at any intended desulfurization rate Z. The curves shown in FIG. 5 are examples in which only the intended desulfurization rate Z is varied while maintaining other parameters, such as the inside diameter of the sparger pipes, the flow rate of the waste gas per one sparger pipe, the pH of the absorbing liquid and the concentration of the sulfurous acid gas in the waste gas, constant. The shape and the position of each curve vary with these parameters.

As described previously, the S value should be. $0.005 \leq S \leq 0.06$. The suitable S value, however, varies depending upon the intended desulfurization rate Z, as seen in FIG. 5. When the desulfurization apparatus is operated under various operation conditions, it is advisable to set the S value at a high value so that the desulfurization can be performed with a low energy consumption.

The $L_{II}/S$ ratio is an important parameter for controlling the performance of the desulfurization apparatus and provides an effective means for performing the desulfurization at an intended desulfurization rate Z with minimum operation costs. The depth $L_{II}$ can be changed by changing the liquid level W. By controlling the amount of the absorbing liquid L in the reactor or by controlling the amount of the oxidizing gas, such as air, fed through a line 12 to the pool of the absorbing liquid L, the liquid level W may be changed to provide a suitable depth $L_{II}$.

In order to efficiently perform the desulfurization, it is necessary to stir the absorbing liquid L by one or more stirrers 10. The stirrer 10 may be composed of a rotating shaft 10' extending vertically or obliquely into the chamber 4 and one or more blades or propellers secured to the tip of the rotating shaft 101 for rotation therewith. In this case, it is preferred that the stirring of the absorbing liquid is carried out with one or more stirrers operated at a total driving power of 0.05–0.2 kW, more preferably 0.08–0.15 kW, per 1 m³ of the absorbing liquid, for reasons of obtaining particularly stable desulfurization rate.

Preferably, the stirring is performed so that there is formed a main recirculating flow (shown by the arrow R in FIG. 1) in the stirred absorbing liquid L. The main flow is accompanied with randomly occurring flows. In FIG. 1, the reference numeral 11 designates an absorbing agent feeding conduit having an injection nozzle from which the absorbing agent is injected into the main recirculating flow R. The absorbing agent is rapidly diffused into the absorbing liquid L and is swiftly supplied to the gas-liquid mixed phase layer A. If desired, the absorbing agent may be fed through a plurality of conduits 11. The absorbing agent can be supplied in the main recirculating flow R at a position upstream or downstream of the blade of the stirrer 10.

The absorbing agent injection nozzle generally has a diameter of 20–100 mm, preferably 25–75 mm. Preferably, a plurality of the nozzles are used for rapidly uniformly dispersing the absorbing agent into the absorbing liquid L and for preventing local increase of pH and deposition of scales on the walls of the sparger pipes. One nozzle is preferably used per 20–500 m³, more preferably 30–300 m³, of the absorbing liquid L. The absorbing agent is injected in an amount of 0.5–20 kg mol/hour, preferably 1–10 kg mol/hour, per one nozzle.

A part of the absorbing liquid L is discharged through a line 13 from the chamber 4 to maintain the content of gypsum in the absorbing liquid L below a predetermined level. If desired, part of the discharged liquid may be treated for the removal of the gypsum, mixed with the absorbing agent and recycled to the first chamber 4 through the line 11. The amount of the absorbing agent incorporated into the recycling absorbing liquid is preferably such that the molar ratio MG/MA of the gypsum ($CaSO_4 \cdot 2H_2O$) contained therein to the absorbing agent is in the range of 0.1–20, more preferably 1–10, for reasons of preventing a local increase of pH in the region adjacent to the gas injection holes 8. Namely, the precipitation of fine gypsum crystals or fine $CaCO_3$ crystals is suppressed. Further, even when such fine crystals are formed, they grow into large crystal particles so that the clogging of the gas injection holes 8 or scaling of the wall of the sparger pipes 7 can be prevented.

If desired, a part of the absorbing liquid L may be recycled to and sprayed in the chamber 5 to cool and wash the waste gas introduced thereinto.

The above-described oxidized gas supplied through the line 12 is preferably injected into the main recirculating flow R at a position downstream of the blade of the stirrer 10. In the gas-liquid mixed phase layer A, the following reaction occurs to fix the sulfurous acid gas contained in the waste gas as gypsum:

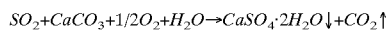
$$SO_2 + CaCO_3 + 1/2 O_2 + H_2O \rightarrow CaSO_4 \cdot 2H_2O \downarrow + CO_2 \uparrow$$

To improve the desulfurization rate Z, it is necessary that the above reaction efficiently proceeds in the gas-liquid mixed phase layer A. It is preferred that the oxidizing gas be introduced into the absorbing liquid L in such an amount that the molar ratio of the oxygen in the oxidizing gas to the sulfurous acid gas in the waste gas is 0.5–6, more preferably 1–5.

Figure 4:
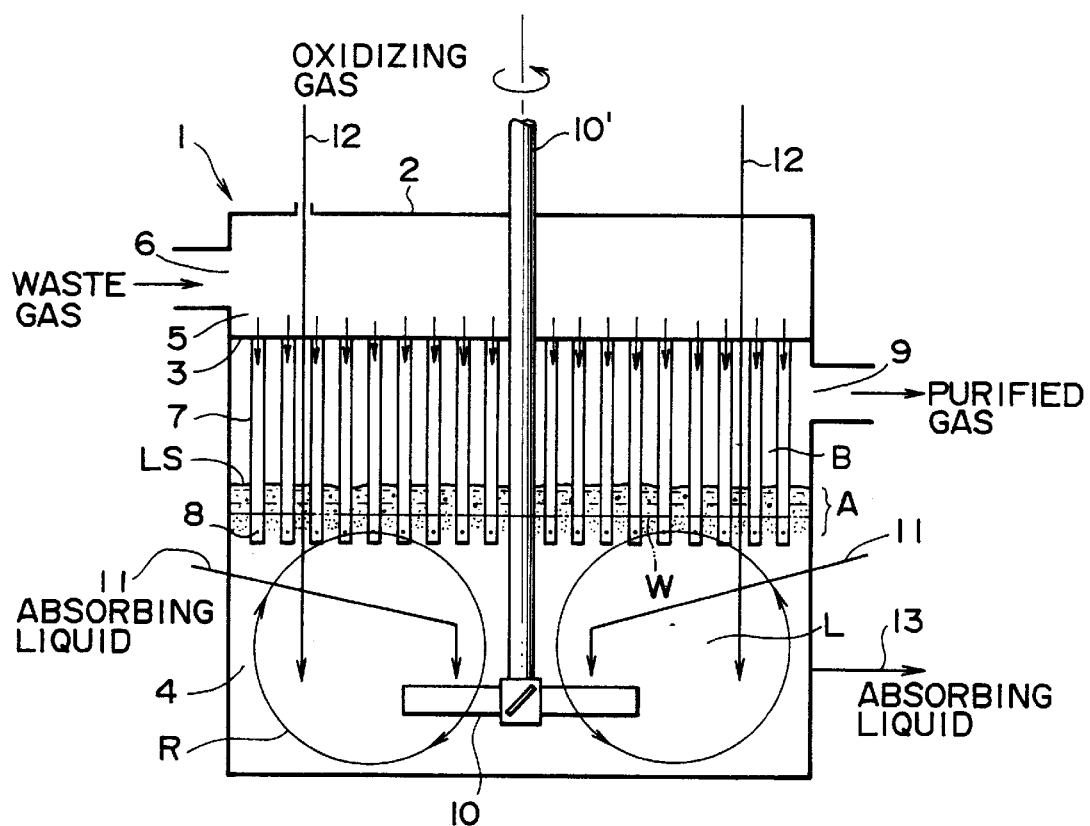
FIG. 4 is an elevational, cross-sectional view, similar to FIG. 1, diagrammatically showing another embodiment of a desulfurization apparatus suitable for carrying out the process of the present invention.

FIG. 4 depicts another embodiment of the desulfurization apparatus in which similar component parts have been designated by the same reference numerals. In this embodiment, the inside space of a housing member 2 is divided by one partition plate member 3 into a first, lower chamber 4 and a second, upper chamber 5. The first chamber 4 contains a pool of an absorbing liquid L such that an upper space B is defined above the liquid level LS of the absorbing liquid L. A waste gas to be treated is introduced through a gas inlet port 6 provided in the second chamber 5 and injected into a pool of the absorbing liquid L through a plurality of sparger pipes 7 secured to the partition plate 3 and a multiplicity of horizontally aligned gas injection holes 8 formed at a lower portion of each of the sparger pipes 7.

The waste gas desulfurized by contact with the absorbing liquid L then flows into the upper space B above the liquid level LS. Preferably, the average ascending velocity of the desulfurized gas in the upper space B is 0.5–5 m/s, more preferably 0.7–4 m/s, while the average horizontal velocity of the desulfurized gas in the upper space B is preferably 8 m/s or less, more preferably 6 m/s or less. During the flow of the desulfurized gas in the upper space B, a greater part of the mist and solid particles contained therein are separated therefrom by gravity and by collision with the sparger pipes 7. The desulfurized gas from which such liquid and solid particles have been separated is discharged from the outlet port 9.

The following example will further illustrate the present invention.

EXAMPLE

A waste gas containing 1,000 ppm of sulfurous acid gas was treated in accordance with the process of the present invention under the following conditions:

Reactor: 13 m×13 m×10 m (height)
Maximum flow rate of waste gas: 1,000,000 m³/hour
Range of flow rate of waste gas: 50–100% (evenly operated)
Desulfurization rate Z: 90%
Density of waste gas $\rho_I$: 1.1 kg/m³
Density of absorbing liquid $\rho_{II}$: 1,100 kg/m³
Sparger pipe (cross-section: circular)
  Diameter $D_S$: 0.15 m
  Distance between adjacent sparger pipes $L_I$: 0.15 m
  Number: 1,390
Gas injection hole (circular)
  Diameter $D_H$: 0.03 m
  Number: 12
  Distance between adjacent holes P: 0.0393 m
Average distance $L_{II}$: 0.2 m
Maximum velocity $V_{max}$: 24.2 m/s
S value: 0.03 m
Pressure Y: about 0.28 m The desulfurization treatment was found to be carried out with minimum costs including installation and construction costs and operation costs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the desulfurization of a waste gas containing sulfur dioxide, the process comprising:
   (1) providing a reaction vessel containing:
      (a) a pool of absorbing liquid having a liquid level, said liquid capable of absorbing said sulfur dioxide and thus desulfurizing the waste gas,
      (b) at least one stirrer for said pool of absorbing liquid;
      (c) a partition plate above the pool of absorbing liquid,
      (d) a plurality of gas dispersing pipes each vertically extending downward from the partition plate into said absorbing liquid and each having a side peripheral wall provided with a multiplicity of gas injection holes at a lower portion thereof,
         (i) said gas injection holes of each of said gas dispersing pipes being substantially horizontally aligned;
         (ii) each adjacent two gas injection holes of each of said gas dispersing pipes are spaced apart from each other such that, when each of said two gas injection holes is regarded as a circle having the same area as the area of the respective gas injection hole, the distance P in meters between the centroid of said adjacent two gas injection holes satisfies the following condition:

$$1.15 \leq P/D \leq 6$$

wherein D is a diameter in meters of one circle of said two circles relating to the two adjacent gas injection holes which is smaller than the other circle;
         (iii) said gas dispersing pipes being arranged such that the distance $L_I$ in meters between nearest two dispersing pipes satisfies the following condition:

$$1.5 \leq L_I/S \leq 10.00$$

wherein S is defined as below; and
      (e) an upper space defined between said partition plate and said liquid level of said absorbing liquid,
   (2) providing said waste gas at a pressure Y where:

$$0.05 \text{ m (waste gas)} \leq Y \leq 1.0 \text{ m (waste gas)}$$

(3) blowing said waste gas into a said pool of absorbing liquid through said gas injection holes up to a maximum velocity $V_{max}$ in meters/sec so that said waste gas is desulfurized by contact with said absorbing liquid, while
      (a) stirring the liquid with the stirrer;
      (b) controlling the maximum velocity $V_{max}$ of said waste gas passing through each of said gas injection holes such that the following conditions are satisfied:
         (i) $0.005 \text{ m} \leq S \leq 0.06 \text{ m}$
         (ii) $4.5 \text{ S} \leq Y \leq 24 \text{ S}$
wherein S represents a value in meters obtained by dividing the dynamic pressure of said waste gas injected through said gas injection hole at said maximum velocity $V_{max}$ by the density of said absorbing liquid, and such that
         (iii) said gas injection holes of each of said gas dispersing pipes are located so that the average distance $L_{II}$ in meters between the liquid level of said absorbing liquid in the state where no gases are injected thereinto and the center of each of said gas injection holes satisfies the following condition:

$$2 \leq L_{II}/S \leq 20$$

wherein S is defined as above; and (4) passing the resulting desulfurized gas the upper space defined between said partition plate and said liquid level of said absorbing liquid.

2. A process as claimed in claim 1, wherein said Y and S satisfy the following conditions:

$$0.05 \text{ m} \leq Y \leq 1.0 \text{ m}$$

$$6.5 \text{ S} \leq Y \leq 22 \text{ S}$$

wherein Y and S are as defined previously.

3. A process as claimed in claim 1, wherein said minimum distance $L_I$ is in the range of 0.05–0.6 m and said average distance $L_{II}$ is in the range of 0.05–0.9 m.

4. A process as claimed in claim 1, wherein the amount of said absorbing liquid in said reaction vessel is controlled so that the ratio $L_{II}/S$ is in the range of 2 to 20.

5. A process as claimed in claim 1, wherein air is blown into said absorbing liquid in an amount so that the ratio $L_{II}/S$ is in the range of 2 to 20.

6. A process as claimed in claim 1, wherein said at least one stirrer operates at a total driving power of 0.05–0.2 kW per 1 m³ of said absorbing liquid.

7. A process as claimed in claim 1, wherein the average ascending velocity of said desulfurized waste gas in said upper space is 0.5–5 m/s and the average horizontal velocity of said desulfurized waste gas in said upper space is 8 m/s or less.

8. A process as claimed in claim 1, wherein each of said gas dispersing pipes has an equivalent diameter of 0.025–0.3 m and each of said gas injection holes has an equivalent diameter of 0.003–0.1 m.

9. A process as claimed in claim 1, wherein said reaction vessel further includes a chamber having a discharge port and defined in an upper portion of the vessel which communicates with said upper space by at least one riser pipe, so that desulfurized waste gas in said upper space flows through at least one riser pipe into the chamber and is discharged from said reaction vessel through a discharge port.

10. A process as claimed in claim 9, wherein the average horizontal velocity of said desulfurized waste in said chamber is 10 m/s or less.

* * * * *